(12) United States Patent
Landy

(10) Patent No.: US 9,202,103 B2
(45) Date of Patent: Dec. 1, 2015

(54) FINGER BIOMETRIC SENSING DEVICE INCLUDING COUPLING CAPACITOR AND RESET CIRCUITRY AND RELATED METHODS

(71) Applicant: Apple Inc., Cupertino, CA (US)

(72) Inventor: Patrick J. Landy, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 310 days.

(21) Appl. No.: 13/934,412

(22) Filed: Jul. 3, 2013

(65) Prior Publication Data

US 2015/0009186 A1 Jan. 8, 2015

(51) Int. Cl.
*G06F 3/041* (2006.01)
*G06K 9/00* (2006.01)

(52) U.S. Cl.
CPC .................... *G06K 9/0002* (2013.01)

(58) Field of Classification Search
CPC ...... G06F 3/0418; G06F 3/045; G06F 3/0488
USPC ................. 345/173–179; 340/5.8, 5.52–5.53, 340/5.81–5.83; 178/18.01–18.04; 382/115, 382/124–126
See application file for complete search history.

(56) References Cited

U.S. PATENT DOCUMENTS

| | | | |
|---|---|---|---|
| 7,486,809 B2 * | 2/2009 | Hara et al. ..................... | 382/124 |
| 9,019,237 B2 * | 4/2015 | Ludwig et al. ................ | 345/175 |
| 2006/0120573 A1 * | 6/2006 | Iori ............................... | 382/124 |
| 2007/0159184 A1 * | 7/2007 | Reynolds et al. ............. | 324/662 |
| 2007/0201727 A1 * | 8/2007 | Birrell et al. .................. | 382/115 |
| 2013/0200997 A1 * | 8/2013 | Miller et al. .................. | 340/5.52 |
| 2013/0257804 A1 * | 10/2013 | Vu et al. ........................ | 345/174 |
| 2013/0265137 A1 * | 10/2013 | Nelson et al. ................. | 340/5.82 |
| 2014/0359757 A1 * | 12/2014 | Sezan et al. ..................... | 726/19 |
| 2015/0030217 A1 * | 1/2015 | Wickboldt et al. ............ | 382/124 |

* cited by examiner

*Primary Examiner* — Kimnhung Nguyen
(74) *Attorney, Agent, or Firm* — Allen, Dyer, Doppelt, Milbrath & Gilchrist, P.A.

(57) ABSTRACT

A finger biometric sensing device may include an array of finger biometric sensing pixel electrodes and amplifiers coupled together in series and to be selectively coupled to respective ones of the array of finger biometric sensing pixels. The finger biometric sensing device may further include at least one coupling capacitor between an output of a given amplifier and a corresponding input of a next amplifier of the plurality thereof, and reset circuitry capable of selectively resetting the input of the next amplifier.

24 Claims, 4 Drawing Sheets

FINGER BIOMETRIC SENSING DEVICE INCLUDING COUPLING CAPACITOR AND RESET CIRCUITRY AND RELATED METHODS

FIELD OF THE INVENTION

The present invention relates to the field of electronics, and, more particularly, to finger sensing devices and related methods.

BACKGROUND OF THE INVENTION

Fingerprint sensors that measure the fingerprint pattern using electric field sensing methods have become established. Fingerprint sensors that are based upon electric field sensing methods measure the fingerprint pattern by establishing an electric field between the finger and the sensor array, and measuring the spatial fluctuations in field strength at the sensor array caused by the shape of the fingerprint ridge and valley pattern.

In some recent applications, the sensor may desirably capture images of fingerprint patterns from fingers that are farther away from the sensor array than is typical with today's technologies. Unfortunately, as the finger gets farther away from the sensor array (for example when a relatively thick dielectric lies between the sensor array and the finger) the spatial field strength variations that represent the fingerprint pattern become weaker. One way to compensate for this loss of spatial pattern strength is to increase the voltage of the signals that generate the field between the finger and the sensor array. The fingerprint spatial pattern strength increases proportionately.

There may be limitations, however, on how much voltage can be placed on the finger and on the sensor array as well. When the voltages on the finger are too high, certain persons with very sensitive fingers may feel that voltage as a slight tingling. This may be undesirable in a consumer product. On the other hand, when voltages are too high on the sensor array, the sensor readout electronics may not perform adequately, for example, they may saturate and generate unacceptable noise, and may even be damaged.

Amplifier and processing stages that read and process the detected signals from the user's finger may limit the detected signal. As these stages are cascaded together, DC offsets inherent in each stage may not fully utilize the dynamic range of the signal. More particularly, the DC offsets may accumulate from each stage limiting the dynamic range of the desired or detected signal. There are several techniques to reduce DC offsets. For example, individual stages may have inherent trimming or calibration cycles, and sampled data systems may include built-in DC sensing and correction cycles. Other techniques may include correlated double sampling using two samples of a signal where any DC offset present in both samples is subtracted out. Band pass filtering of the signal attenuates DC and other undesired low frequency errors.

SUMMARY

A finger biometric sensing device may include an array of finger biometric sensing pixel electrodes, and a plurality of amplifiers coupled together in series and to be selectively coupled to respective ones of the array of finger biometric sensing pixels. The finger biometric sensing device also includes at least one coupling capacitor between an output of a given amplifier and a corresponding input of a next amplifier of the plurality thereof, and reset circuitry capable of selectively resetting the input of the next amplifier. Accordingly, the finger biometric sensing device may provide a more accurate finger biometric sensing, for example, by increasing the dynamic range of the series coupled amplifiers.

The reset circuitry may be capable of resetting the input of the next amplifier to a reset voltage, for example. The reset circuitry may include a reset signal generator and at least one switch driven thereby.

The finger biometric sensing device may further include a semiconductor substrate on which the plurality of amplifiers, the at least one coupling capacitor, and the reset circuitry are integrated, for example. The plurality of amplifiers may include a first amplifier having an input to be selectively coupled to the respective ones of the array of finger biometric sensing pixel electrodes. The reset circuitry may be capable of selectively resetting the input of the first amplifier.

The next amplifier may include a differential amplifier with an input comprising a pair of differential input terminals, for example. The at least one coupling capacitor may include a respective coupling capacitor associated with each of the pair of differential input terminals. The reset circuitry may include a respective switch associated with each of the pair of differential input terminals, for example.

The finger biometric sensing device may also include a finger coupling electrode adjacent the array of finger biometric sensing pixel electrodes. Drive circuitry may be coupled to the finger coupling electrode and the array of finger biometric sensing pixel electrodes, for example.

A method aspect is directed to a method of compensating for offsets between a plurality of amplifiers coupled together in series and to be selectively coupled to respective ones of an array of finger biometric sensing pixel electrodes in a finger biometric sensing device. The method may include using reset circuitry to selectively reset an input of a next amplifier of the plurality thereof to compensate for the offsets. An output of a given amplifier and a corresponding input of the next amplifier having at least one coupling capacitor therebetween.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in different embodiments.

Figure 1:
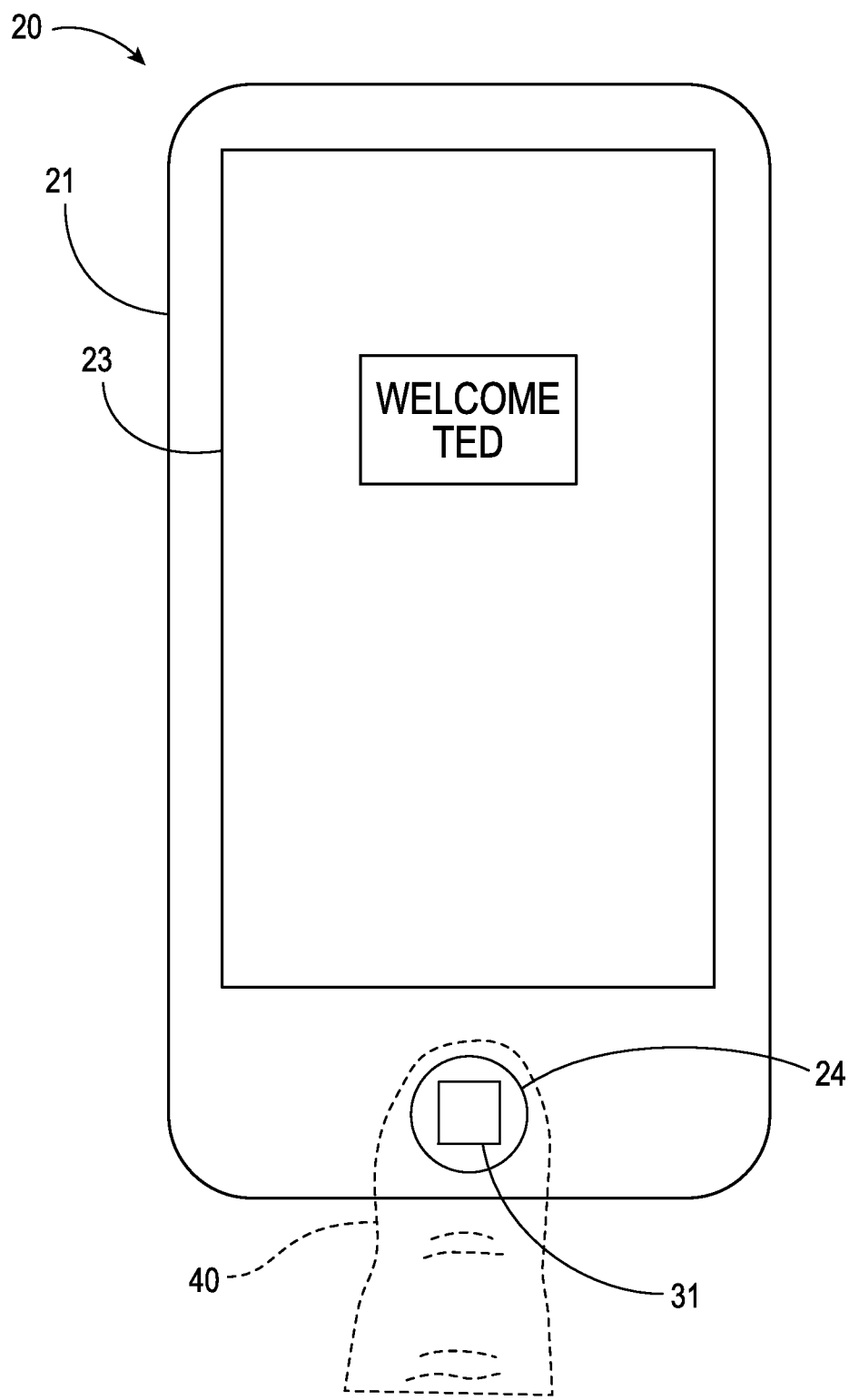
FIG. 1 is a plan view of an electronic device according to an embodiment.
Figure 2:
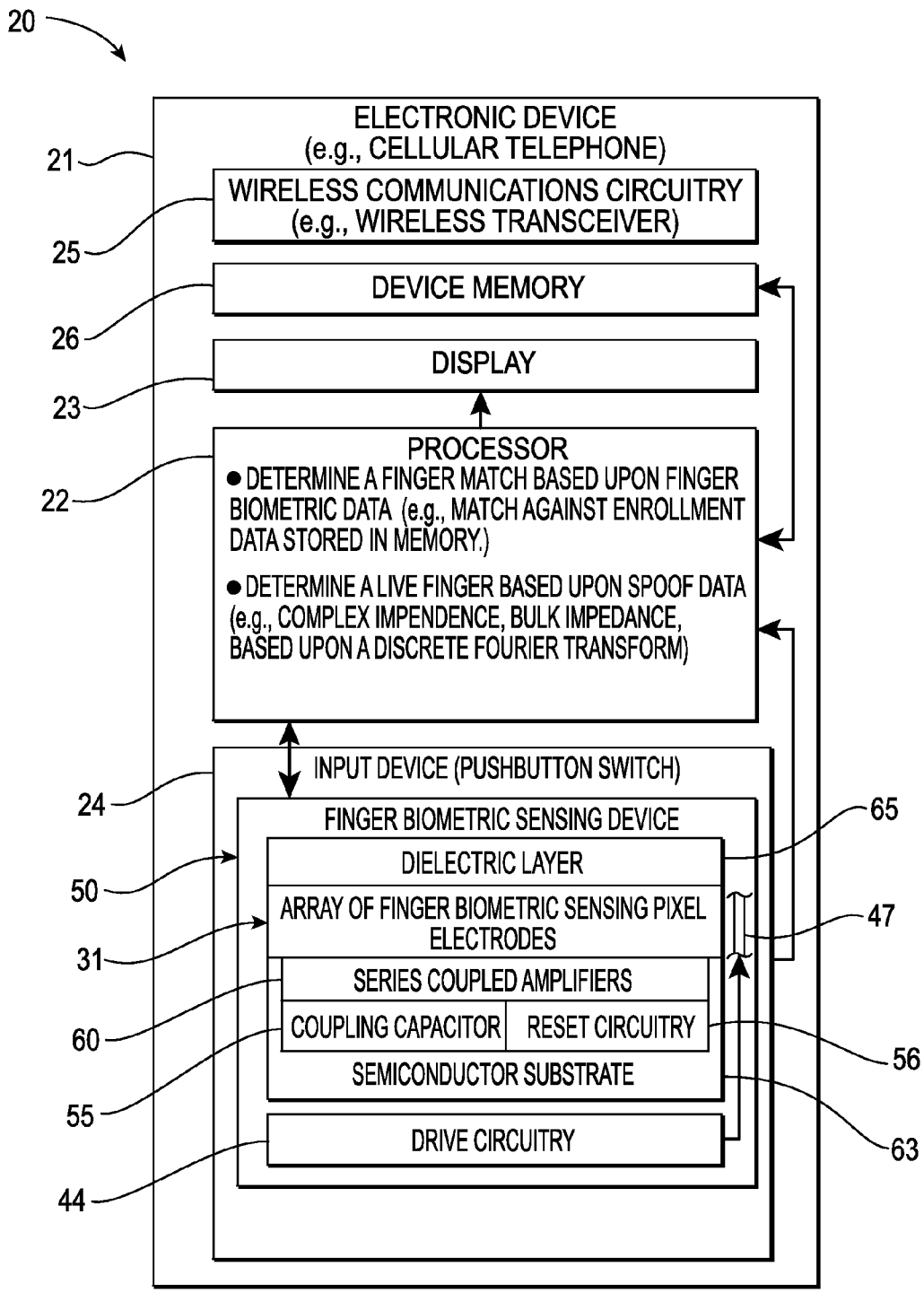
FIG. 2 is a schematic block diagram of the electronic device of FIG. 1.
Figure 3:
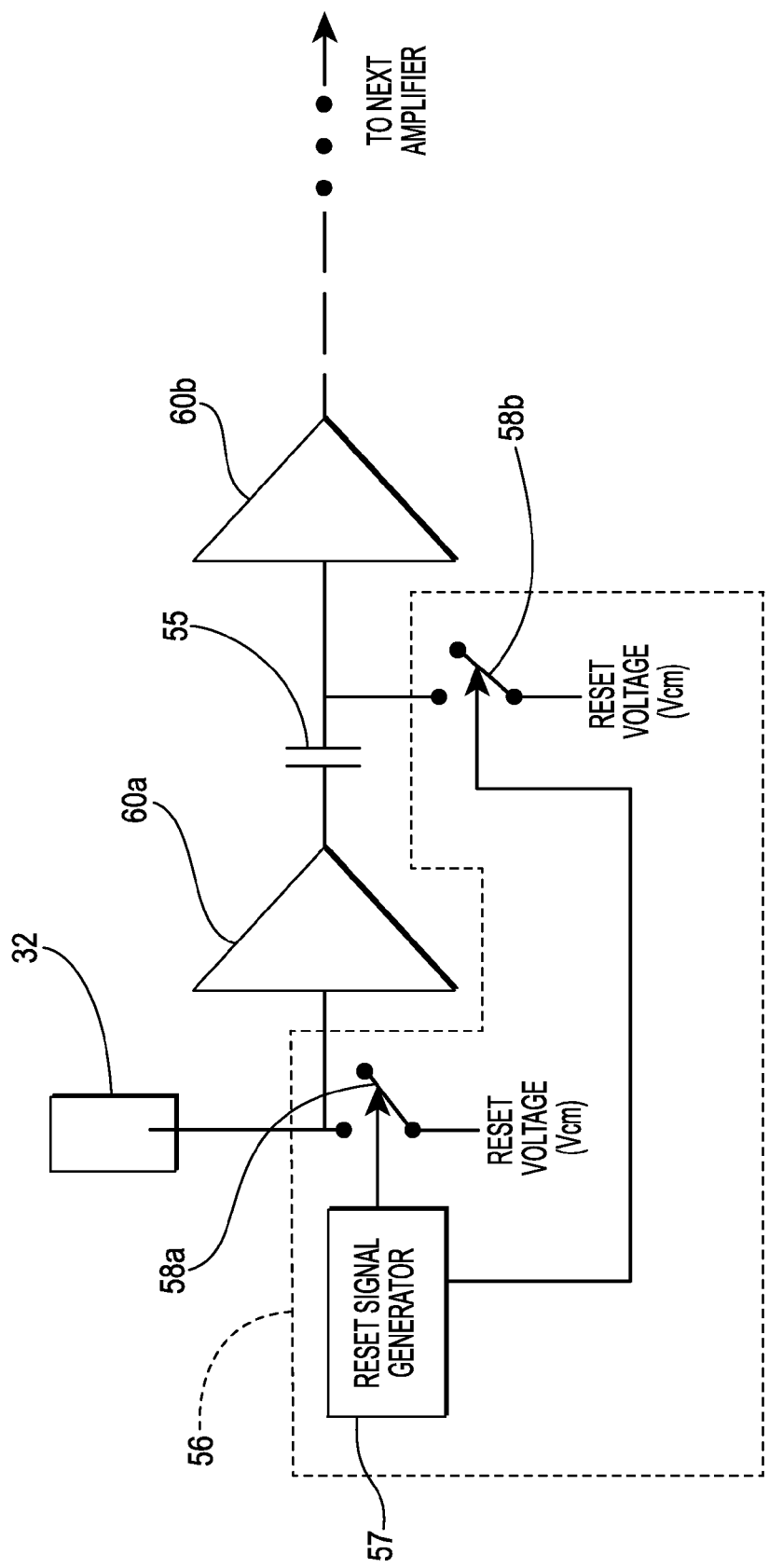
FIG. 3 is a schematic circuit diagram of a portion of the finger biometric sensing device of the electronic device of FIG. 2.

Referring initially to FIGS. 1-3, an electronic device 20 is now described. The electronic device 20 illustratively includes a portable housing 21 and a processor 22 carried by the portable housing. The electronic device 20 is illustratively a mobile wireless communications device, for example, a cellular telephone. The electronic device 20 may be another type of electronic device, for example, a tablet computer, laptop computer, etc. In some embodiments, the electronic device 20 may be an integrated circuit for use with another or host electronic device.

Wireless communications circuitry 25 (e.g. a wireless transceiver, cellular, WLAN Bluetooth, etc.) is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25.

A display 23 is also carried by the portable housing 21 and is coupled to the processor 22. The display 23 may be a liquid crystal display (LCD), for example, or may be another type of display, as will be appreciated by those skilled in the art. A device memory 26 is also coupled to the processor 22.

A finger-operated user input device, illustratively in the form of a pushbutton switch 24, is also carried by the portable housing 21 and is coupled to the processor 22. The pushbutton switch 24 cooperates with the processor 22 to perform a device function in response to the pushbutton switch. For example, a device function may include a powering on or off of the electronic device 20, initiating communication via the wireless communications circuitry 25, and/or performing a menu function.

More particularly, with respect to a menu function, the processor 22 may change the display 23 to show a menu of available applications based upon pressing of the pushbutton switch 24. In other words, the pushbutton switch 24 may be a home switch or button, or key. Of course, other device functions may be performed based upon the pushbutton switch 24. In some embodiments, the finger-operated user input device 24 may be a different type of finger-operated user input device, for example, forming part of a touch screen display. Other or additional finger-operated user input devices may be carried by the portable housing 21.

The electronic device 20 includes a finger biometric sensing device 50, which may be in the form of one or more integrated circuits (ICs) as will be described in further detail below. The finger biometric sensing device 50 includes an array of finger biometric sensing pixel electrodes 31 to sense a user's finger 40 or an object placed adjacent the array of finger biometric sensing pixel electrodes. The array of finger biometric sensing pixel electrodes 31, i.e. electric field sensing pixel electrodes, generally relies on an extremely high impedance sensing input. The impedance is typically kept relatively high to maintain improved sensitivity. For example, a typical input may be a gate of a complementary metal oxide semiconductor (CMOS) transistor, as will be appreciated by those skilled in the art.

The array of finger biometric sensing pixel electrodes 31 is carried by the pushbutton switch 24 so that when a user or object contacts and/or presses downward on the pushbutton switch, data from the user's finger 40 is acquired, for example, for finger matching and/or spoof detection, for example. In other words, the array of finger biometric sensing pixel electrodes 31 may cooperate with circuitry, as will be explained in further detail below, to be responsive to static contact or placement of the user's finger 40 or object. Of course, in other embodiments, for example, where the array of finger biometric sensing pixel electrodes 31 is not carried by a pushbutton switch, the array of finger biometric sensing pixel electrodes may cooperate with circuitry to be responsive to sliding contact (i.e. a slide sensor), or responsive to static placement (i.e. a standalone static placement sensor).

The processor 22 may also cooperate with the array of finger biometric pixel sensing electrodes 31 to determine a finger match based upon finger biometric data. More particularly, the processor 22 may determine a finger match based upon enrollment data stored in the device memory 26. The processor 22 may also determine a live finger based upon spoof data. More particularly, the processor 22 may determine a live finger based upon a complex impedance and/or bulk impedance measurement.

In some embodiments, the processor 22 may cooperate with the array of finger biometric pixel sensing electrodes 31 to perform a navigation function, for example. Of course the processor 22 may cooperate with the array of finger biometric sensing electrodes 31 and/or other circuitry to perform other or additional functions, as will be appreciated by those skilled in the art.

Figure 4:
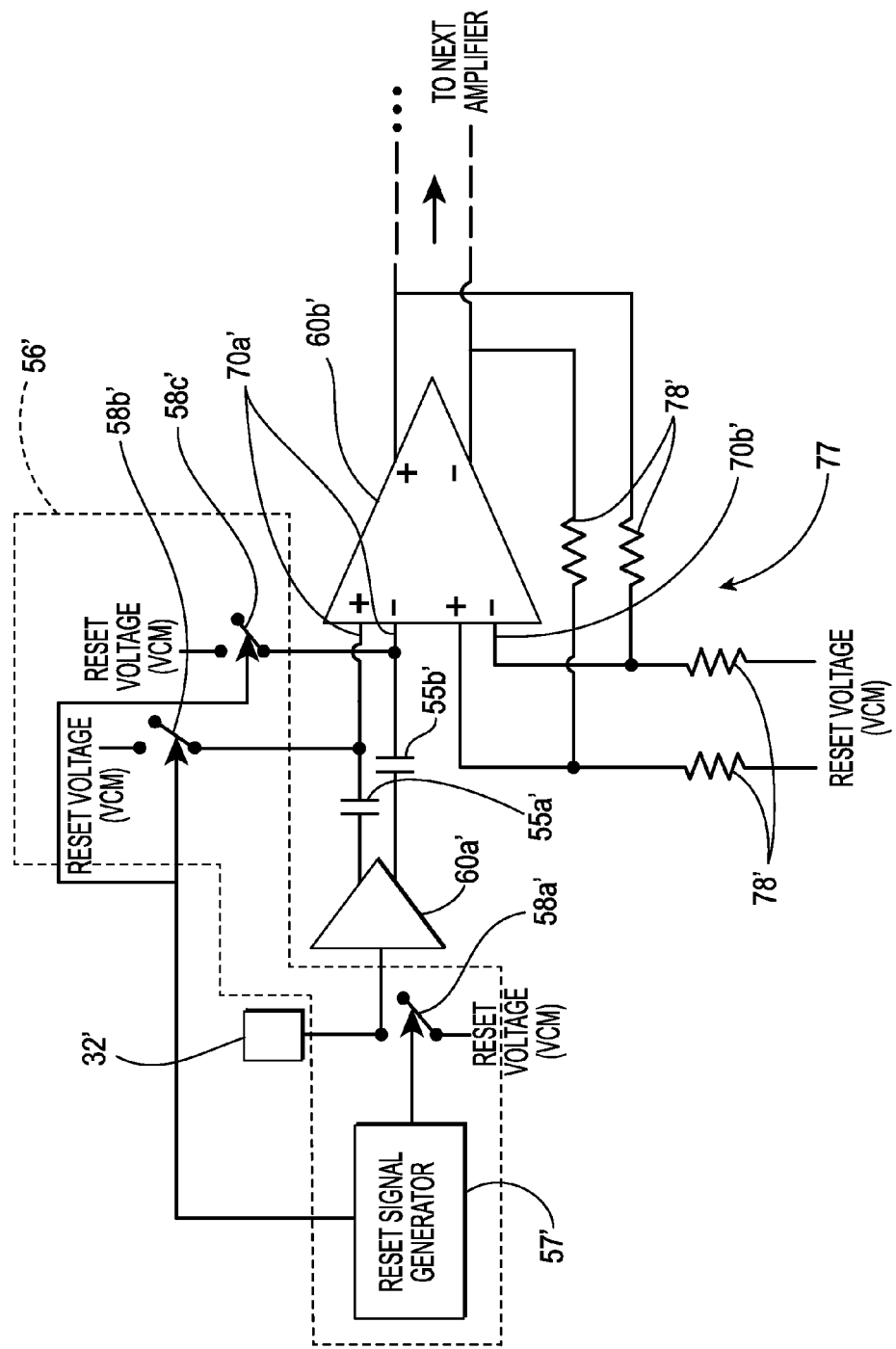
FIG. 4 is a schematic circuit diagram of a portion of a finger biometric sensing device according to another embodiment.

The finger biometric sensing device 50 also includes series coupled amplifiers 60, and more particularly, first and second amplifiers 60a, 60b, (FIG. 3) which may each define gain stages, coupled together in series and that are respectively coupled to the ones of the array of finger biometric pixel sensing electrodes 31. The first and second amplifiers 60a, 60b may be regarded as continuous time components, as will be appreciated by those skilled in the art. While two amplifiers 60a, 60b are illustrated, it will be appreciated by those skilled in that additional amplifiers may be coupled in series downstream or upstream and may define further gain stages. In other words, the finger biometric sensing device 50 may include any number of gain stages or amplifiers coupled in series. In some embodiments, the first amplifier 60a may be a differential amplifier, for example, as illustrated in FIG. 4.

Finger biometric data or information is typically carried within AC signals, as there is typically no useful information at DC. Additionally, it may be particularly desirable for the finger biometric sensing device 50 to have increased sensitivity. Increased sensitivity may be particularly advantageous, for example, where the user's finger 40 is further away from the array of finger biometric sensing pixel electrode 31 by way of a dielectric layer 65 or other coating, as will be explained in further detail below. The series coupling or cascading of the amplifiers, for example, the first and second amplifiers 60a, 60b, introduces DC offset voltages all along the processing chain. For example, if a finger biometric sensing device includes three gain stages with 10 V/V gain per stage and no DC offset correction, a 10 mV input offset voltage would be 10V at the output, which may be out of range for most portable systems where voltages are typically 3V or less.

To address the DC offset, a coupling capacitor 55 is between an output of the first amplifier 60a and a corresponding input of the second amplifier 60b. The coupling capacitor 55 blocks or reduces DC offsets from one stage to the next, or more particularly, from the first amplifier 60a to the second amplifier 60b. Of course, while the coupling capacitor 55 is illustratively coupled between the first and second amplifiers 60a, 60b, the coupling capacitor may be coupled between any two amplifiers of the series coupled amplifiers.

The first and second amplifiers 60a, 60b, or gain stages, each have relatively high impedance inputs, which may reduce any droop during "normal" processing or acquisition of finger biometric data. The combination of the coupling capacitor 55 with the relatively high impedance may reduce the drive capability from one stage to the next, or more particularly, from the first to the second amplifier 60a, 60b, and therefore reduce overall power.

Reset circuitry 56 is coupled between the first and second amplifiers 60a, 60b. The reset circuitry includes a reset signal generator 57 and first and second switches 58a, 58b driven by the reset signal generator. The first switch 58a is coupled between an input of the first amplifier 60a and a pixel plate 32 associated with a finger biometric pixel sensing electrode of the plurality thereof 31, and coupled to the reset signal generator 57. The second switch 58b is coupled between the first and second amplifiers 60a, 60b, and coupled to the reset signal generator 57. The reset circuitry 56 is capable of, through operation of the second switch 58b, resetting the input of the second amplifier 60b, for example, to a reset voltage (VCM) or common mode voltage.

The reset circuitry 56 may also be capable of resetting, through operation of the first switch 58a, the first amplifier 60a to the reset voltage. The value of the reset voltage at the first amplifier 60a and at the second amplifier 60b may be the same in some embodiments, or may have different values in other embodiments. The reset circuitry 56 may provide a relatively stable operating point for the input of the array of finger biometric sensing pixel electrodes 31, but may also provide a reduced impact to the relatively high impedance sensing capability by way of a reset signal that switches the input to a bias point.

In other words, the reset signal generated from the reset signal generator 57 operates the switches 58a, 58b to establish a DC bias level, in a synchronized manner, for the first and second amplifiers 60a, 60b, or subsequent cascaded processing or gain stages, through the first and second switches 58a, 58b. The reset circuitry 56 de-asserts the reset signal or does not reset the input of the amplifiers 60a, 60b to the reset voltage during "normal" signal processing or acquiring finger biometric data. More particularly, the reset signal may be de-asserted so that inputs to the array finger biometric sensing pixel electrodes 31 are at a high impedance again, and set for the sensing cycle, but with a relatively stable initial operating point. Of course, while reference is made to first and second amplifiers 60a, 60b, it will be appreciated that the reset circuitry 56 may reset the input of any next amplifier in the series coupled amplifiers. In other words, while the finger biometric sensing device 50 may include any number of gain stages or amplifiers coupled in series, the circuitry described herein is applicable to any of a given and next amplifier in the series thereof.

As noted above, the finger biometric sensing device 50 may be in the form of an integrated circuit. More particularly, the finger biometric sensing device 50 may include a semiconductor substrate 63 on which the series coupled amplifiers 60, the coupling capacitor 55, and the reset circuitry 56 are integrated (FIG. 2). More components and circuitry may be integrated on the semiconductor substrate 63.

The finger biometric sensing device 50 also includes drive circuitry 44 capable of generating a drive signal coupled to the array of finger sensing pixel electrodes 31. The finger biometric sensing device 50 also a finger coupling electrode 47 adjacent the array of finger sensing pixel electrodes 31 and coupled to the drive circuitry 44. The array of finger sensing pixel electrodes 31 and the amplifiers 60a, 60b may have a circuit reference associated therewith. The circuit reference may be coupled to a device ground, for example, so that the drive circuitry 44 drives the finger coupling electrode 47 with respect to the circuit reference and the device ground.

As noted above, the finger biometric sensing device 50 may also include a dielectric layer 65 over the array of finger biometric finger sensing electrodes 31. The dielectric layer 65 may have has a non-uniform thickness. In other words, the dielectric layer 65 may have a larger thickness in one location than in another location and may vary between 100 μm-500 μm. This may be a result of the manufacturing process, for example, or may be intentional, for example, where a curved shape dielectric layer is desired. For example, for a concave shaped dielectric layer 65, the change in thickness of the dielectric material above the array of finger sensing pixel electrodes 31 or sensor die may cause the detected signal to vary.

Referring now to FIG. 4, in another embodiment, the next amplifier is in the form of a differential amplifier 60b' having a pair of differential input terminals 70a'. First and second coupling capacitors 55a', 55b' are illustratively associated with each of the pair of differential input terminals 70a'. Respective switches 58b', 58c' are also associated with each of the pair of differential input terminals 70a'. The switches 58b', 58c' operate similarly to the switches described above in that they each are capable of switching to reset the first and second inputs 70a' of the differential amplifier 60b'. Of course, the amplifier 60a' may also be a differential amplifier in some embodiments.

The differential amplifier 60b' improves isolation and supply rejection, for example, as compared to a non-differential amplifier. A feedback network 77' including resistors 78' is coupled to a second pair of differential inputs 70b'. More particularly, the feedback network 77' may be a negative feedback network that may establish increased precision gain. The reset voltage of voltage common mode (VCM) may be the same in some embodiments, but in other embodiments, the VCM may be different.

As will be appreciated by those skilled in the art, DC offset may additionally be generated by other components of the finger biometric sensor 50. For example, in an IC finger biometric sensing device that includes an array of finger biometric finger sensing pixel electrodes (e.g. a two dimensional array), the array generates DC offsets due to the finite matching of components. Moreover, the relatively large number of biometric pixel sensing electrode in the array may result in a wide range of matching and increased overall DC offset range. The large number of signals associated with the finger biometric finger sensing pixel electrodes may be multiplexed to a limited number of processing channels for increased efficiency. Within the processing channels, it may be desirable that the circuitry process DC offsets both from the array of finger biometric sensing pixel electrodes and their own inherent offsets.

For increased sensitivity, besides DC offsets, it may be desirable to reduce noise in the signal path. Certain processing circuits have larger inherent noise due to fundamental limitations. Thus, in a cascaded system with various stages, it may be desirable to place the larger noise circuits after the lower noise circuits. Many existing circuits that are used in frontend architectures of finger biometric sensing devices process DC offsets, but at the expense of increased noise. Examples of such circuits include switched capacitor circuits which have larger noise due to fundamental KT/C limitations. Correlated double samplers or various sample and hold circuits have the same kind of limitations. This class of circuits also increases latency which, in-turn, adversely effects acquisition time. Mixers or multipliers that translate, in terms of frequency, signals to lower, more easily processed frequencies typically have larger numbers of active components and frequency harmonics that drive up noise levels. Additionally, there may be additional filtering for removing aliasing signals or unwanted harmonics, but these circuits may also increase noise.

The coupling capacitor 55 between the output of a given amplifier 60a and the input of a next amplifier 60b, and the reset circuitry 56 advantageously addresses DC offsets with reduced noise. The finger biometric sensing device 50 described herein may be particularly advantageous for providing relatively low noise processing circuits that can handle DC offsets for relatively highly sensitive capacitive sensing architectures. The finger biometric sensing device 50 described herein may also be particularly advantageous for continuous time processing such that low noise circuits with little or no latency can be applied.

Moreover, the finger biometric sensing device 50 removes an increased amount of DC offsets between gain stages or the series coupled amplifiers 60 via the coupling capacitor 55. Thus, the high pass cutoff frequency is not set by an RC network, which typically requires relatively large values making it difficult to integrate and also keep low noise (high resistance increases noise).

Instead, the reset signal cycle from the array of finger biometric sensing pixel electrodes is reused and the cutoff frequency is set by the coupling capacitor 55 and high input impedance of the next amplifier or gain stage. If, for example, the next gain stage or amplifier is a MOSFET gate input, this may result in cutoffs in a range of several to tens of Hertz, which may be low enough for many applications. In addition, this low cutoff frequency is achieved without relatively large settling time transients at start-up, and is not increasingly sensitive to signal glitches that may cause some coupling circuits to become highly distorted during operation, for example. Other inter-stage coupling circuits that rely on relatively large value resistors, current sources, and feedback, for example, to set the input bias voltage, increase overall noise and may require higher power.

Still further, the reset circuitry 56 and the coupling capacitor 55 may allow for placement of the amplifiers 60a, 60b for increased overall device performance (e.g. low noise stages first). Indeed, a relatively low power implementation is achieved with the relatively small coupling capacitor 55 and near zero additional power may thus be used to set input bias voltage.

Other and/or additional amplifiers or processing stage functions may be used that operate based upon a relatively high input impedance. For example, such functions may include gain, buffering, level translation, programmable gain, filtering, attenuation, subtraction, calibration, etc. Additionally, while the finger biometric sensing device 50 described herein, and more particularly, the coupling techniques described herein, may be relatively easily applied to CMOS or BiCMOS technology, it will be appreciated by those skilled in the art, that such techniques may also be applied to any technology that includes a high input impedance component and switches (e.g. JFET, GaAs, etc.).

A method aspect is directed to a method of compensating for offsets between a plurality of amplifiers 60 coupled together in series and to be selectively coupled to respective ones of an array of finger biometric sensing pixel electrodes 31 in a finger biometric sensing device 50. The method includes using the reset circuitry 56 to selectively reset an input of a next amplifier 60b of the plurality thereof to compensate for the offsets. An output of a given amplifier 60a and a corresponding input of the next amplifier 60b having at least one coupling capacitor 55 therebetween.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A finger biometric sensing device comprising:
   an array of finger biometric sensing pixel electrodes;
   a plurality of amplifiers coupled together in series and to be selectively coupled to respective ones of the array of finger biometric sensing pixels;
   at least one coupling capacitor between an output of a given amplifier and a corresponding input of a next amplifier of the plurality thereof; and
   reset circuitry capable of selectively resetting the input of the next amplifier.

2. The finger biometric sensing device of claim 1, wherein the reset circuitry is capable of resetting the input of the next amplifier to a reset voltage.

3. The finger biometric sensing device of claim 1, wherein the reset circuitry comprises a reset signal generator and at least one switch driven thereby.

4. The finger biometric sensing device of claim 1, further comprising a semiconductor substrate on which the plurality of amplifiers, the at least one coupling capacitor, and the reset circuitry are integrated.

5. The finger biometric sensing device of claim 1, wherein the plurality of amplifiers comprises a first amplifier having an input to be selectively coupled to the respective ones of the array of finger biometric sensing pixel electrodes; and wherein the reset circuitry is capable of selectively resetting the input of the first amplifier.

6. The finger biometric sensing device of claim 1, wherein the next amplifier comprises a differential amplifier with an input comprising a pair of differential input terminals.

7. The finger biometric sensing device of claim 6, wherein the at least one coupling capacitor comprises a respective coupling capacitor associated with each of the pair of differential input terminals.

8. The finger biometric sensing device of claim 7, wherein the reset circuitry comprises a respective switch associated with each of the pair of differential input terminals.

9. The finger biometric sensing device of claim 1, further comprising a finger coupling electrode adjacent the array of finger biometric sensing pixel electrodes; and drive circuitry coupled to the finger coupling electrode and the array of finger biometric sensing pixel electrodes.

10. An electronic device comprising:
    a housing;
    wireless communications circuitry carried by the housing and capable of performing at least one wireless communications function;
    a user input device carried by the housing; and
    a finger biometric sensing device carried by the user input device and comprising
    an array of finger biometric sensing pixel electrodes,
    a plurality of amplifiers coupled together in series and to be selectively coupled to respective ones of the array of finger biometric sensing pixel electrodes,
    at least one coupling capacitor between an output of a given amplifier and a corresponding input of a next amplifier of the plurality thereof, and
    reset circuitry capable of selectively resetting the input of the next amplifier.

11. The electronic device of claim 10, wherein the reset circuitry is capable of resetting the input of the next amplifier to a reset voltage.

12. The electronic device of claim 10, wherein the reset circuitry comprises a reset signal generator and at least one switch driven thereby.

13. The electronic device of claim 10, wherein the finger biometric sensing device further comprises a semiconductor substrate on which the plurality of amplifiers, the at least one coupling capacitor, and the reset circuitry are integrated.

14. The electronic device of claim 10, wherein the plurality of amplifiers comprises a first amplifier having an input to be selectively coupled to the respective ones of the array of finger biometric sensing pixel electrodes; and wherein the reset circuitry is capable of selectively resetting the input of the first amplifier.

15. The electronic device of claim 10, wherein the next amplifier comprises a differential amplifier with an input comprising a pair of differential input terminals.

16. The electronic device of claim 15, wherein the at least one coupling capacitor comprises a respective coupling capacitor associated with each of the pair of differential input terminals.

17. The electronic device of claim 16, wherein the reset circuitry comprises a respective switch associated with each of the pair of differential input terminals.

18. A method of compensating for offsets between a plurality of amplifiers coupled together in series and to be selectively coupled to respective ones of an array of finger biometric sensing pixel electrodes in a finger biometric sensing device, the method comprising:

using reset circuitry to selectively reset an input of a next amplifier of the plurality thereof to compensate for the offsets, an output of a given amplifier and a corresponding input of the next amplifier having at least one coupling capacitor therebetween.

19. The method of claim 18, wherein using the reset circuitry comprises using the reset circuitry to reset the input of the next amplifier to a reset voltage.

20. The method of claim 18, wherein using the reset circuitry comprises using reset circuitry comprising a reset signal generator and at least one switch driven thereby.

21. The method of claim 18, wherein the plurality of amplifiers comprises a first amplifier having an input to be selectively coupled to the respective ones of the array of finger biometric sensing pixel electrodes; and wherein using the reset circuitry comprises using the reset circuitry to selectively reset the input of the first amplifier.

22. The method of claim 18, wherein the next amplifier comprises a differential amplifier with an input comprising a pair of differential input terminals.

23. The method of claim 22, wherein the at least one coupling capacitor comprises a respective coupling capacitor associated with each of the pair of differential input terminals.

24. The method of claim 23, wherein using the reset circuitry comprises using a respective switch associated with each of the pair of differential input terminals.

* * * * *